United States Patent
Kreider

(10) Patent No.: US 10,175,065 B2
(45) Date of Patent: Jan. 8, 2019

(54) NEAR-ZERO REVOLUTIONS PER MINUTE (RPM) SENSING

(71) Applicant: HONEYWELL INTERNATIONAL INC., Morris Plains, NJ (US)

(72) Inventor: Thom Kreider, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 333 days.

(21) Appl. No.: 15/013,671

(22) Filed: Feb. 2, 2016

(65) Prior Publication Data

US 2017/0219381 A1 Aug. 3, 2017

(51) Int. Cl.
| | |
|---|---|
| *B60L 1/00* | (2006.01) |
| *G01D 5/16* | (2006.01) |
| *B64G 1/28* | (2006.01) |
| *G01B 7/30* | (2006.01) |
| *G01C 19/06* | (2006.01) |
| *G01B 1/00* | (2006.01) |

(52) U.S. Cl.
CPC ............. *G01D 5/16* (2013.01); *B64G 1/283* (2013.01); *B64G 1/285* (2013.01); *B64G 1/286* (2013.01); *G01B 7/30* (2013.01); *G01C 19/06* (2013.01); *B60L 2200/00* (2013.01); *G01B 1/00* (2013.01); *G01B 2210/00* (2013.01)

(58) Field of Classification Search
CPC ......... B60L 1/00; B60L 2200/00; G01B 1/00; G01B 2210/00
See application file for complete search history.

(56) References Cited

U.S. PATENT DOCUMENTS

| | | | |
|---|---|---|---|
| 3,968,352 A | 7/1976 | Andeen | |
| 4,732,353 A | 3/1988 | Studer | |
| 5,386,738 A | 2/1995 | Havenhill | |
| 5,419,212 A | 5/1995 | Smith | |
| 5,751,078 A * | 5/1998 | Loewenthal | B64G 1/22 244/165 |
| 6,231,011 B1 | 5/2001 | Chue et al. | |
| 6,254,036 B1 | 7/2001 | Sevaston | |
| 6,377,352 B1 | 4/2002 | Coronato et al. | |
| 6,603,230 B1 * | 8/2003 | Abel | F16C 32/0444 310/74 |

(Continued)

FOREIGN PATENT DOCUMENTS

| | | |
|---|---|---|
| CN | 101219714 A | 7/2008 |
| CN | 100452633 C | 1/2009 |

(Continued)

OTHER PUBLICATIONS

Extended EP Search Report for Application No. 17151534.9-1754 dated Jun. 28, 2017.

(Continued)

*Primary Examiner* — Jermele M Hollington
*Assistant Examiner* — Temilade Rhodes-Vivour
(74) *Attorney, Agent, or Firm* — Lorenz & Kopf, LLP

(57) ABSTRACT

A rotor assembly for deployment within a momentum control device that enables near-zero revolutions per minute (RPM) sensing, and method for making same, are provided. The provided rotor assembly utilizes a magnet coupled to the rotor shaft and a stationary sensor element to detect magnetic flux from the magnet and derive reliable near zero RPM therefrom.

15 Claims, 3 Drawing Sheets

(56) References Cited

U.S. PATENT DOCUMENTS

| | | | |
|---|---|---|---|
| 6,672,544 | B2 | 1/2004 | McGovern et al. |
| 6,775,599 | B2 | 8/2004 | Meffe et al. |
| 7,116,077 | B2 * | 10/2006 | Raftari ................ B60K 6/365 |
| | | | 318/798 |
| 7,198,232 | B1 | 4/2007 | Ratan et al. |
| 7,376,496 | B1 | 5/2008 | Weigl et al. |
| 7,661,627 | B2 | 2/2010 | Defendini et al. |
| 7,694,596 | B2 | 4/2010 | Mitterreiter |
| 8,346,410 | B2 | 1/2013 | Seo et al. |
| 8,918,236 | B2 | 12/2014 | Hamilton |
| 9,091,606 | B2 | 7/2015 | Fitz-Coy et al. |
| 2002/0124663 | A1 * | 9/2002 | Tokumoto ................ B62D 6/10 |
| | | | 73/862.333 |
| 2006/0284020 | A1 | 12/2006 | Klupar et al. |
| 2008/0099626 | A1 | 5/2008 | Bialke |
| 2012/0115674 | A1 * | 5/2012 | Ikegami ................ B60K 6/36 |
| | | | 477/3 |
| 2013/0082147 | A1 | 4/2013 | De Castro et al. |
| 2013/0105633 | A1 | 5/2013 | Lagadec et al. |
| 2014/0035398 | A1 | 2/2014 | Ruan et al. |
| 2014/0209751 | A1 | 7/2014 | Stagmer |
| 2015/0050170 | A1 * | 2/2015 | Kozaki ............... F16C 32/0489 |
| | | | 417/423.12 |

FOREIGN PATENT DOCUMENTS

| | | |
|---|---|---|
| CN | 104097791 A | 10/2014 |
| DE | 2842205 A1 | 4/1980 |
| DE | 202005015431 U1 | 3/2006 |

OTHER PUBLICATIONS

Yasir, M.; Development and Implementation of the Attitude Control Algorithms for the Micro-Satellite Flying Laptop; Institute for Space Systems; Mar. 15, 2010.

Kim, DK et al.; Development of a Spherical Reaction Wheel Actuator Using Electromagnetic Induction; May 10, 2014.

Gerber, J.; A 3-Axis Attitude Control System Hardware Design for a CubeSat; Department of Electrical and Electronic Engineering, University of Stellenbosch, South Africa; Dec. 2014.

Brewer, M.R.; Cubesat Attitude Determination and Helmholtz Cage Design; Department of the Air Force Air University; Mar. 2012.

Auret, J.; Design of an Aerodynamic Attitude Control System for a CubeSat; Department of Electrical and Electronic Engineering University of Stellenbosch, South Africa; Mar. 2012.

EP Examination Report for Application No. 17151534.9 dated Apr. 16, 2018.

* cited by examiner

NEAR-ZERO REVOLUTIONS PER MINUTE (RPM) SENSING

TECHNICAL FIELD

The present invention relates generally to momentum control devices, such as reaction wheel assemblies and control moment gyroscopes; and, more particularly, to a rotor assembly with improved near-zero revolutions per minute (RPM) sensing for deployment within a momentum control device.

BACKGROUND

Momentum control devices, most notably control moment gyroscopes and reaction wheels, are commonly deployed within attitude control systems aboard vehicles, such as spacecraft. A generalized momentum control device includes a rotor assembly rotatably mounted within a rotor assembly housing. The rotor assembly includes an inertial element, typically a rotating mass or an outer rim, which is fixedly coupled to a rotor shaft. The first end of the rotor shaft (often referred to as the "fixed end" of the rotor shaft) is mounted within a first bore provided within the rotor assembly housing such that the first end forms a rotating portion of the rotor assembly, but is otherwise confined, relative to the rotor assembly housing. The second end of the rotor shaft (the "floating end" of the rotor shaft) is suspended within a second bore provided in the rotor assembly such that the second end is able to move axially and radially within certain limits, as well as rotate, relative to the rotor assembly housing. A bearing (e.g., a duplex-pair ball bearing) is disposed over each shaft end to facilitate rotation of the rotor assembly. During operation of a momentum control device, a spin motor causes the rotor assembly to rotate about a spin axis. If the momentum control device assumes the form of a reaction wheel, the rotor assembly housing may be directly mounted to a vehicle such as spacecraft. If the momentum control device assumes the form of a control moment gyroscope ("CMG"), the rotor assembly housing may be rotatably disposed within an outer stator housing (e.g., a basering structure), which may be mounted to a vehicle.

With respect to a Reaction Wheel Assembly (RWA), when adjustment of the attitude of the host vehicle is required, a spin motor drives the rotational speed and/or direction of the rotor shaft, resulting in a momentum change. The momentum change and resulting output torque from the RWA is transferred to the host vehicle, effectuating an attitude adjustment. A single RWA is typically combined with two or more additional RWAs to produce a Reaction Wheel Assembly Array (RWAA). An RWAA containing at least three RWAs can perform highly controlled attitude adjustments about three orthogonal axes for the host vehicle.

During operation of the RWA, the spin motor drives rotation of the rotor shaft about the spin axis over a wide range of rotational speeds (for example, from −6000 to +6000 revolutions per minute (RPM)), thus establishing the momentum. The RWA motor hall-effect sensors form a crude, low resolution encoder typically relied upon to measure the (i) rotational frequency of the rotor shaft, and (ii) sign of the rotor shaft velocity. Current RWA designs generally implement a low resolution tachometer using these measurements to minimize cost and improve reliability; however, such tachometers generally do not meet preferred performance specifications when rotational speed is near zero due to the limited resolution of the digital encoder.

To compensate for the inadequate near-zero RPM performance of conventional tachometers, RWAs typically use a use-case technique referred to as "speed biasing" to avoid going through zero RPM during minor momentum exchanges. A speed biased RWA has its "zero" momentum origin arbitrarily set at a predetermined rotational velocity away from true zero RPMs. This is accomplished by dumping vehicle momentum until the RWAA zero momentum state is at a low RWA rotor velocity greater than zero. This allows the vehicle to navigate without reversing the RWA rotor spin direction often. However, by avoiding true zero RPM, speed biasing subjects the RWA to constant elevated spin speed, each of which accelerates degradation of components and reduces the overall lifespan of the RWA. This is a drawback, as many RWA applications require extended lifespans.

Accordingly, a rotor assembly that enables near-zero revolutions per minute (RPM) sensing for deployment within a momentum control device, and method for making same is desirable. The desirable rotor assembly utilizes a magnet coupled to the rotor shaft and a sensor element to detect magnetic flux from the magnet and derive reliable near zero RPM data therefrom.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A rotor assembly for deployment within a momentum control device is provided. The rotor assembly comprising: a rotor; a rotor shaft coupled to the rotor; a first sensor assembly coupled to the rotor shaft, providing (i) a first rotor shaft rotational position (RSRP) data, and (ii) an associated frequency of rotation; a magnet coupled to the rotor shaft; a second sensor assembly coupled to the rotor shaft and configured to sense magnetic flux output of the magnet and provide a second RSRP data therefrom; and a controller coupled to the first source of RSRP data and the second source of RSRP data and configured to (i) receive the first RSRP data and the second RSRP data, and (ii) generate final RSRP data therefrom.

A method, executable by a controller, for providing rotor shaft rotational position (RSRP) data for a rotor assembly for deployment within a momentum control device, the rotor assembly having a rotor shaft coupled to a rotor and a magnet, is provided. The method comprising: sensing, by a stationary sensor assembly, magnetic flux output of the magnet coupled to the rotor shaft; determining, by the stationary sensor assembly, angular position data associated with the rotor shaft; and generating final rotor shaft rotational position (RSRP) data based on angular position data determined by the sensor assembly.

Another rotor assembly for deployment within a momentum control device is provided. The rotor assembly comprising: a controller coupled to a first sensor assembly and configured to receive first rotor shaft rotational position (RSRP) data and associated frequency therefrom; and a sensor assembly coupled to the controller and comprising a sensor element that is disposed a predetermined distance from a magnet, the sensor element configured to sense magnetic flux output of the magnet and derive a second RSRP data therefrom; and wherein the controller is configured to receive second RSRP data and generate final RSRP data based on first RSRP data and second RSRP data.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Operations, tasks, and functions are sometimes referred to as being a set of "instructions;" such instructions may be stored in memory or a database and then computer-executed, computerized, software-implemented, or computer-implemented. The instructions may also be converted into hardware using logic gates and/or a field programmable gate array (FPGA).

In practice, one or more processor devices can carry out the described operations, tasks, and functions by manipulating electrical signals representing data bits at memory locations in the system memory (for example memory 204), as well as other processing of signals. The memory locations where data bits are maintained (for example a database) are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

Figure 4:
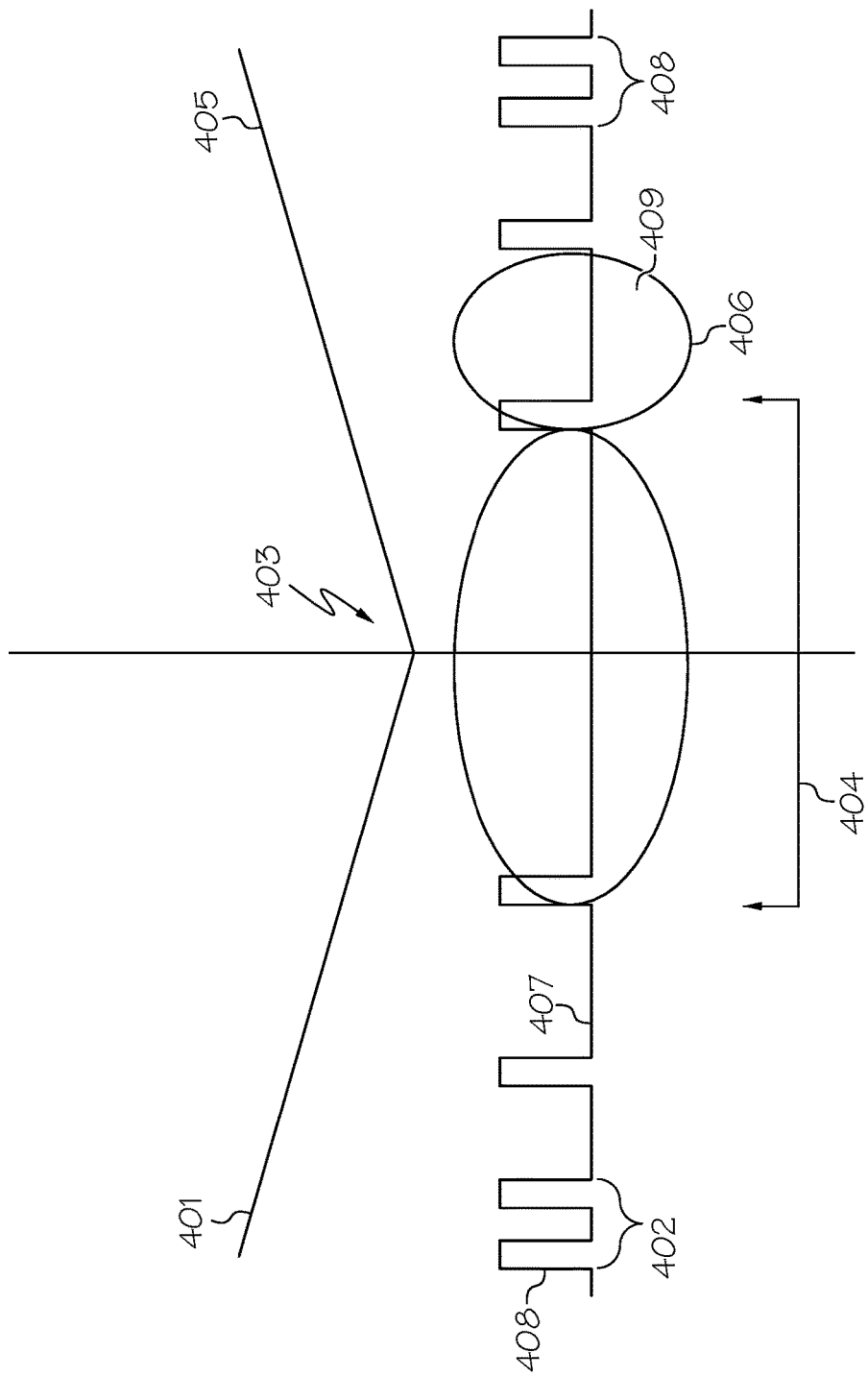
FIG. 4 is a timing diagram showing a typical pulse output of a conventional tachometer in the near-zero RPM range.

Below, a reaction wheel in accordance with prior art is first described in detail to provide context. Following that, exemplary embodiments of a rotor assembly are introduced to highlight features of the present invention. FIG. 4 depicts the near-zero RPM blindness of a conventional tachometer in order to further highlight an advantage provided by the present invention.

Figure 1:
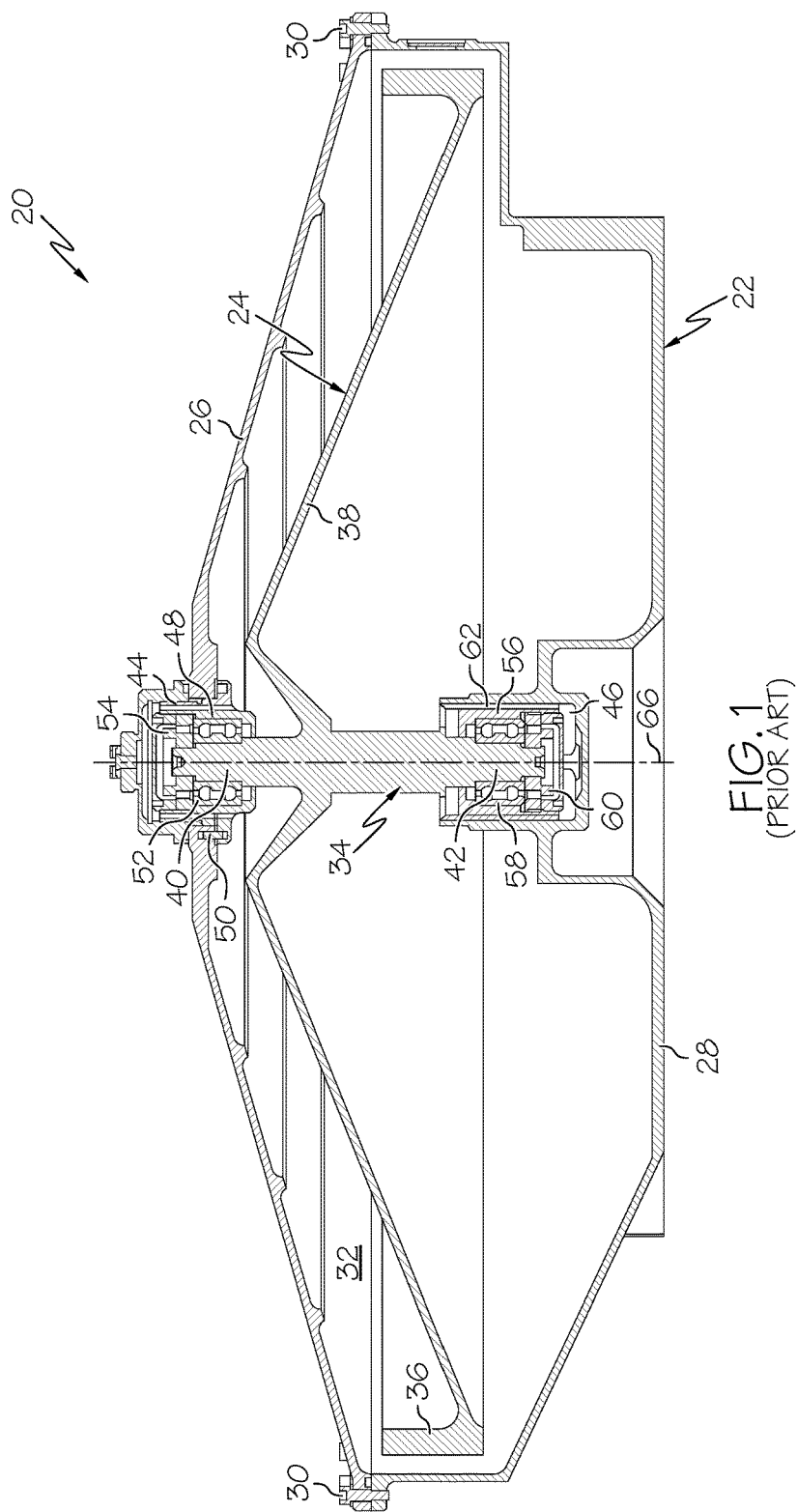
FIG. 1 is cross-sectional view of a reaction wheel in accordance with the teachings of prior art.

FIG. 1 is cross-sectional view of a reaction wheel 20 in accordance with the teachings of prior art. Reaction wheel 20 includes a rotor assembly housing 22 and a rotor assembly 24, which is rotatably mounted within rotor assembly housing 22. With reference to the orientation shown in FIG. 1, rotor assembly housing 22 includes an upper cover 26 and a lower casing 28, which is fixedly joined to upper cover 26 utilizing a plurality of threaded fasteners 30. Collectively, upper cover 26 and lower casing 28 define an internal cavity 32, which houses rotor assembly 24 and various other components of reaction wheel 20 that are conventionally known and not described herein in the interests of concision (e.g., a spin motor, a resolver or other rotational sensor, etc.). Rotor assembly 24 includes a rotor shaft 34 and a rotor rim 36, which is joined to rotor shaft 34 via a suspension web 38.

Rotor shaft 34 has a fixed end portion 40 (the upper end portion of shaft 34 in the illustrated orientation) and a floating end portion 42 (the lower end portion of shaft 34 in the illustrated orientation). Fixed end portion 40 and floating end portion 42 are received within first and second annuli 44 and 46, respectively, provided within rotor assembly housing 22. A fixed bearing cartridge 48 is disposed around fixed end portion 40 of rotor shaft 34 and fixedly attached to upper cover 26 by a plurality of threaded fasteners 50 (only one of which is shown in FIG. 1).

Fixed bearing cartridge 48 includes a spin bearing 52 (e.g., a duplex-pair ball bearing), which is disposed around fixed end portion 40 to facilitate the rotation of rotor shaft 34. A first nut 54 is threadably coupled to fixed end portion 40 and generally retains spin bearing 52 thereon. Similarly, a floating bearing cartridge 56 is disposed around floating end portion 42 of rotor shaft 34 and includes a spin bearing 58 (e.g., a duplex-pair ball bearing), which is retained on floating end portion 42 by a second nut 60. A floating cartridge sleeve 62 is disposed around floating bearing cartridge 56 and affixed to the inner structure of lower casing 28 defining annulus 46. Notably, floating cartridge sleeve 62 is spatially offset from floating bearing cartridge 56 by a small annular gap to permit floating bearing cartridge 56, and therefore floating end portion 42 of rotor shaft 34, to move radially and axially during operation of reaction wheel 20. Such freedom of movement helps to accommodate expansion and contraction that may occur between components (e.g., floating bearing cartridge 56 and floating cartridge sleeve 62) over the operational temperature and vacuum range of reaction wheel 20.

During operation of reaction wheel 20, a spin motor (not shown) rotates rotor assembly 24 about a spin axis (represented in FIG. 1 by dashed line 66). In a first sensor assembly (FIG. 2 first sensor assembly 250), an encoder (not shown) is typically coupled to a stationary portion of the rotor assembly housing 22 and the rotor shaft 34 and employed to provide (i) a first rotor shaft rotational position (RSRP) data, and (ii) an associated frequency of rotation that may be used to generate digital pulses corresponding to the rotational speed (velocity) and direction of rotation of the rotor shaft 34.

As mentioned above, conventional encoders provide satisfactory performance at low cost for high RPMs. The encoder typically outputs a digital pulse train based on rotational position, and that digital pulse train is used to compute rotor shaft revolutions per minute (RPMs). At high rotational speeds (FIG. 4, area 402), the pulse train is updated very fast, and at low speeds the pulse train is updated more slowly. At near zero speed, rotational position is updated too slowly to be used by the control loop of the spacecraft. Conventional encoders also determine a direction of rotation, but they require several "ticks" on the pulse train before the corresponding direction bit is valid. Therefore, when the RPMs are near zero (FIG. 4, area 404), conventional encoders are inadequate at providing both rotational speed and direction of rotation information which leads to loss of control of the spacecraft. Since the first sensor assembly 250 may be a conventional digital encoder, the first sensor assembly 250 is occasionally referred to as an encoder. In embodiments herein, the first sensor assembly 250 has a predetermined lower frequency threshold, and a predetermined upper frequency threshold, the lower and upper frequency thresholds are used in a blending process described in more detail below.

Figure 2:
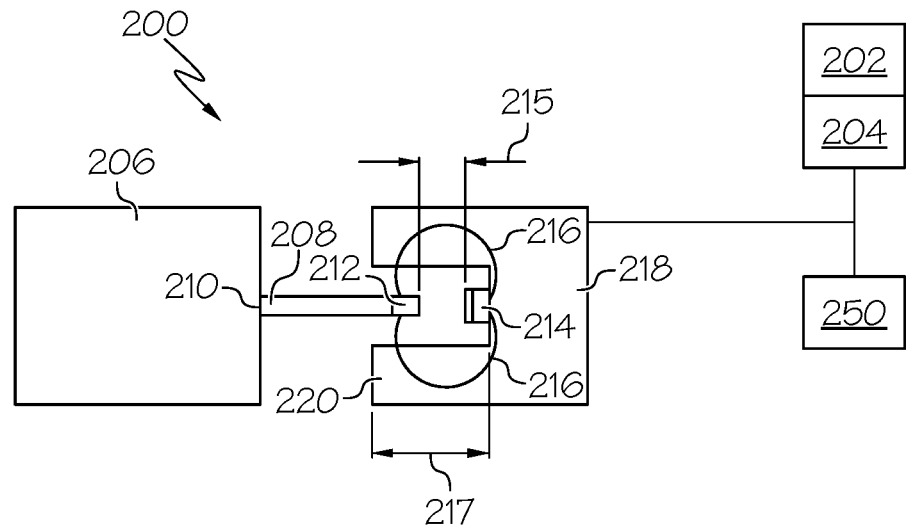
FIG. 2 is a block diagram of a rotor assembly having improved near zero sensing, in accordance with an exemplary embodiment.
Figure 3:
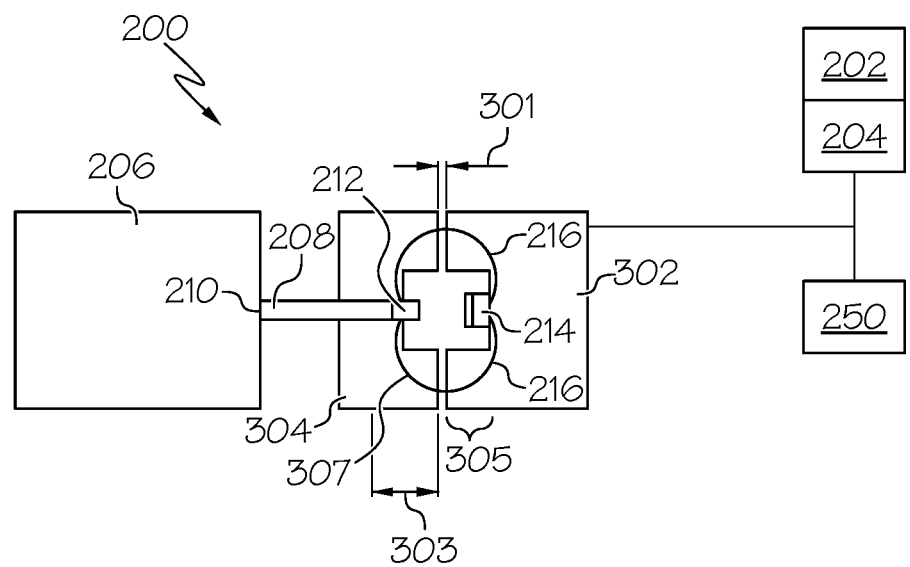
FIG. 3 is a block diagram of an rotor assembly having improved near zero sensing, in accordance with another exemplary embodiment.

FIGS. 2 and 3 describe rotor assembly embodiments providing improved near zero RPM sensing. RWA designs relying on the below provided embodiments may avoid implementing the speed biasing that conventional encoder designs generally require, advantageously reducing wear and tear on individual components and increasing lifespan of RWA designs.

FIG. 2 is a block diagram of a rotor assembly having improved near zero sensing, in accordance with an exemplary embodiment. FIG. 2 is not to scale. A rotating portion of the rotor assembly comprises a rotor shaft 208 coupled on a first end 210 to a rotor 206. As used herein, rotor 206 comprises an inertial element, such as a rotating mass or wheel (not shown). Magnet 212 is coupled onto a second end of the rotor shaft 208, opposite the rotor 206 and rotating mass. As the rotor shaft 208 spins, the magnet 212 spins. Magnet 212 is selected to have an orientation and strength to produce an output magnetic flux 216 which uniquely identifies the angular position of the rotor shaft 208 (and hence the angular position of the corresponding rotating mass or wheel). On a stationary portion of the rotor assembly of FIG. 2, a second sensor assembly senses magnetic flux output of the magnet 212 and derives a second rotor shaft rotational position data (RSRP) therefrom.

The second sensor assembly comprises a stationary cylindrical housing (the cylindrical housing is defined by first side 218 and walls 220) partially surrounding the magnet 212. In three dimensions, the stationary cylindrical housing looks essentially like a cup that envelopes the magnet 212 and extends uniformly toward the rotor 206 a first predetermined length 217. Magnet 212 outputs magnetic flux 216. While magnetic flux 216 is depicted in two dimensions, as discrete lines, it is readily understood that, in practice, magnetic flux has a three dimensional volume emanating from the magnet 212 and looping back toward magnet 212 (hence, referred to as a magnetic flux loop); additionally, the magnetic flux 216 volume edges fade out rather than discretely end. The second sensor assembly also comprises a sensor element 214 that is disposed a predetermined distance 215 from the magnet 212. The stationary housing is designed to have a shape, dimension, and material to substantially confine a closed magnetic flux loop generated by the magnet 212.

The sensor element 214 is disposed within the stationary housing on an inner surface of the first side 218, and positioned with respect to the magnet 212 in order to be substantially fully saturated by the magnetic flux 216 as it returns to the magnet 212. The sensor element 214 may be a magneto resistive sensor, such as an Anisotropic Magneto resistive (AMR) Whetstone bridge sensor (referred to herein as an AMR sensor for simplicity) selected to have radiation tolerance commensurate with the remainder of the RWA assembly. Other magneto resistive devices including Giant Magneto Resistive (GMR), Tunnel Magneto Resistive (TMR), and Extraordinary Magneto Resistive (EMR) may be used in a similar fashion.

The data output of the AMR sensor is typically a quadrature analog voltage that is proportional to the field orientation about the AMR sensor. The quadrature output from the sensor can be processed by controller 202 and accurately decoded, even in the presence of common-mode noise or amplitude changes caused by magnetic field losses due to temperature variation, decay of the magnet, etc. The quadrature analog output voltage is buffered and digitally sampled (using conventional analog to digital (ADC) techniques), and therefrom a unique rotor shaft rotational position (RSRP) and unique angular velocity of the rotor shaft 208 can be determined, also using known computational techniques similar to an analog tachometer or resolver. Contemporary AMR Whetstone bridge sensors may maintain 0.05 degrees angular resolution to approximately 42,000 RPM, thereby capably handling the needs of many momentum control device applications. It is contemplated that future versions of AMR sensors may output a high speed digital serial output, further simplifying the AMR sensor determination of RSRP. In an embodiment, the ADC conversion and derivation of RSRP may occur in the controller 202. In another embodiment, the necessary circuitry for the ADC conversion and derivation of RSRP are in the second sensor assembly.

In some embodiments, a controller 202 and memory 204 are coupled to the stationary cylindrical housing, and to a first sensor assembly 250. Controller 202 may also be coupled to the second sensor assembly. In practice, controller 202 may comprise, or be associated with, any suitable number of individual microprocessors, mission control computers, navigational equipment, memories (such as memory 204), power supplies, storage devices, interface cards, and other standard components known in the art. In this respect, the controller 202 may include or cooperate with any number of software models, software programs or instructions designed to carry out a variety of methods, process tasks, calculations, and control functions described herein.

The controller 202 receives the RSRP data from the first sensor assembly 250 and the RSRP data derived from the second sensor assembly, and generates final RSRP data therefrom. The controller 202 may switch from one source of RSRP data to another in a digital switching fashion, or employ blending techniques. In a digital switching embodiment, below a predetermined lower frequency threshold of the first sensory assembly 250 (corresponding to a predetermined rotor shaft rotational speed, RPM), the final RSRP data is equal to the RSRP data determined by the second sensor assembly; and, above the predetermined lower velocity threshold, the final RSRP data is the RSRP data from the first source of RSRP data. Further still, it is contemplated that the first source of RSRP data may be omitted, in which case blending is not required and the final RSRP data may be only the RSRP data derived via the second sensor assembly.

As mentioned, generating the final RSRP data may involve blending to ensure a smooth transition from the high speed encoder (first sensor assembly 250) derived RSRP data to the AMR derived (second sensor assembly) RSRP data. In some embodiments, a predetermined upper frequency threshold is also employed, and blending (via a blending algorithm) may be performed by the controller 202 in a region between the predetermined lower frequency threshold and the predetermined upper frequency threshold. Blending may be accomplished via a blending algorithm stored in memory 204, or controller 202 may digitally blend two RSRP data inputs using a digital signal processor (DSP), application specific integrated circuit (ASIC), or field programmable gate array (FPGA). Blending algorithms may take a number of approaches including as examples, a continuous Kalman filter or a discrete approach.

A classic Kalman filter can use the two sensor sources to create a single velocity estimation using known techniques for Kalam filter design. A discrete approach assumes the digital encoder is used when rotor shaft velocity is faster than the MR sensor analog bandwidth or phase margin allows accurate reading. In this mode, 100% of the rotor shaft velocity data is derived from the encoder (first sensor assembly 250). At zero and near zero RPMs, the blending algorithm derives rotor shaft velocity directly from the MR sensor (the second sensory assembly) and the encoder is reserved for motor accurate commutation purposes. The RPM cutoff for using the MR sensor exclusively may be dependent on one or more of: the performance of the analog signal chain; the analog-to-digital converter performance; motor pole count; and, the control loop frequency which consumes shaft velocity data. It is anticipated that the cutoff is placed at, or above a respective encoder update rate which matches the control loop of the spacecraft. During the transition from MR to encoder based velocity estimation, a weighted or linearly proportional average of the two sensor estimates can be derived.

FIG. 3 is a block diagram of rotor assembly having improved near zero sensing, in accordance with another exemplary embodiment. FIG. 3 is not to scale. In FIG. 3, the stationary cylindrical housing extends toward the rotating mass a second predetermined length 305 that is less than the first predetermined length 217, and the sensor assembly further comprises: a circular disc 304 coaxially coupled to the rotor shaft 208 on the rotor 206 side of the magnet 212, the circular disc having an integral outer lip 307 of a uniform predetermined height 303 that extends toward the cylindrical housing of the sensor assembly. The integral outer lip 307 and the cylindrical housing have substantially equal diameters and are separated by a first gap distance 301. As with the cylindrical housing in FIG. 2, the cylindrical housing (302 and 305), circular disc 304, first gap distance 301 and integral outer lip 307 are designed to essentially form a cup that envelopes the magnet 212, thereby cooperating to substantially contain the magnetic flux 216. As with FIG. 2, the sensor element 214 is positioned to be substantially fully saturated by the magnetic flux 216.

FIG. 4 is a timing diagram showing a typical pulse train output 400 of a conventional tachometer in the near-zero RPM range. The pulse train starts at a high rotational speed at 401, spins down to zero RPMs at 403, and begins to spin back up to a high rotational speed in an opposite direction at 405. At high rotational speeds (area 402 in a first direction, and area 408 in an opposite direction), the pulse train is updated very fast, and at low speeds the pulse train is updated more slowly. As previously mentioned, conventional tachometers determine a direction of rotation, but to do so they require several "ticks" on the pulse train after passing through zero RPM before the corresponding direction bit is valid. Therefore, when the RPMs are near zero (area 404), conventional tachometers essentially have a blind spot, in which they are inadequate at providing both rotational speed and direction of rotation information.

The present invention addresses this blind spot with the combined second sensor assembly (MR derived RSRP data) and first sensor assembly (encoder derived RSRP data) described hereinabove. Generating magnetic flux and sensing it as provided in this invention enables reliable RPM derivations in the near zero range, reducing wear and tear on components and increasing life of the bearing assembly versus running the wheel at biased speed. The aforementioned predetermined velocity threshold may be implemented as, for example, a "plus" predetermined velocity threshold 407, and a "minus" predetermined velocity threshold 409, wherein the "plus" and "minus" are used to designate spin in a first direction and spin in a second direction. At the predetermined velocity threshold (407, 409), an embodiment blends RSRP data determined by a conventional encoder and from, for example, an AMR sensor.

Thus, there has been provided a rotor assembly for deployment within a momentum control device that enables near-zero revolutions per minute (RPM) sensing, and method for making same. The provided rotor assembly utilizes a magnet coupled to the rotor shaft and a sensor element to detect magnetic flux from the magnet and derive reliable near zero RPM therefrom. The provided rotor assembly may employ an Anisotropic Magneto resistive (AMR) Whetstone bridge sensor selected to have an application specific radiation tolerance.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A rotor assembly for deployment within a momentum control device, the rotor assembly comprising:
   a rotor;
   a rotor shaft coupled to the rotor;
   a first sensor assembly coupled to the rotor shaft, providing (i) a first rotor shaft rotational position (RSRP) data, and (ii) an associated frequency of rotation;
   a magnet coupled to the rotor shaft;
   a second sensor assembly coupled to the rotor shaft and configured to sense magnetic flux output of the magnet and provide a second RSRP data therefrom; and
   a controller coupled to the first source of RSRP data and the second source of RSRP data and configured to (i)

receive the first RSRP data and the second RSRP data, and (ii) generate final RSRP data therefrom; and
wherein the second sensor assembly comprises:
a sensor element; and
a stationary housing partially surrounding the magnet, the housing enclosed on a first side and open on a second side, and wherein the sensor element is disposed within the housing on an inner surface of the first side.

2. The rotor assembly of claim 1, wherein the stationary housing extends, on the second side, uniformly toward the rotating mass a first predetermined length, thereby confining a closed magnetic flux loop generated by the magnet.

3. The rotor assembly of claim 1, wherein the stationary housing extends, on the second side, uniformly toward the rotor a second predetermined length that is less than the first predetermined length, and the rotor assembly further comprising:
a circular disc coaxially coupled to the rotor shaft on a rotor side of the magnet, the circular disc having an integral outer lip of a uniform predetermined height that extends toward the housing of the sensor assembly; and
wherein (i) a diameter of the outer lip and a diameter of the housing are substantially equal, (ii) the outer lip and housing are separated by a first gap distance, and (iii) the housing, circular disc, and outer lip cooperate to confine a closed magnetic flux loop generated by the magnet.

4. The rotor assembly of claim 2, wherein the sensor element uniquely identifies an angular position associated with the rotor shaft.

5. The rotor assembly of claim 4, wherein the sensor element is a Magneto Resistive sensor.

6. The rotor assembly of claim 3, wherein the sensor element uniquely identifies an angular position associated with the rotor shaft.

7. The rotor assembly of claim 6, wherein the sensor element is a Magneto Resistive sensor.

8. The rotor assembly of claim 5, wherein the controller is configured to generate final RSRP data comprising only second sensor assembly RSRP data below a predetermined lower frequency threshold of the first RSRP data source.

9. The rotor assembly of claim 8, wherein the controller is configured to generate final RSRP data comprising only first sensor assembly RSRP data above a predetermined upper frequency threshold of the first RSRP data source.

10. The rotor assembly of claim 9, wherein the controller is further configured to blend first RSRP data and second RSRP data when the first RSRP frequency is between the predetermined upper frequency threshold and the predetermined lower frequency threshold.

11. The rotor assembly of claim 9, wherein the controller is further configured to blend RSRP data using a Kalman filter.

12. The rotor assembly of claim 5, wherein generating final RSRP data comprises providing only second sensor assembly RSRP data.

13. The rotor assembly of claim 8, wherein generating final RSRP data further comprises (i) blending first RSRP data with second RSRP data at the predetermined lower frequency threshold and (ii) providing first RSRP data above the predetermined frequency threshold.

14. A rotor assembly for deployment within a momentum control device, the rotor assembly comprising:
a controller coupled to a first sensor assembly and configured to receive first rotor shaft rotational position (RSRP) data and associated frequency therefrom; and
a sensor assembly coupled to the controller and comprising a sensor element that is disposed a predetermined distance from a magnet, the sensor element configured to sense magnetic flux output of the magnet and derive a second RSRP data therefrom, the sensor element configured to uniquely identify an angular position associated with a rotor shaft; and
wherein the controller is configured to receive second RSRP data and generate final RSRP data based on first RSRP data and second RSRP data;
wherein the final RSRP data comprises:
the second RSRP data when a the RSRP of the first sensor assembly has an associated frequency that is below a predetermined frequency threshold,
the first RSRP data when the RSRP of the first sensor assembly has an associated frequency that is above the predetermined frequency threshold, and,
first RSRP data blended with second RSRP data when the RSRP of the first sensor assembly has an associated frequency that is equal to the predetermined frequency threshold.

15. The rotor assembly of claim 14, wherein the sensor assembly further comprises a stationary housing partially surrounding the magnet, the housing enclosed on a first side and open on a second side, and wherein the sensor element is disposed within the housing on an inner surface of the first side, and wherein the housing extends uniformly toward the rotor a first predetermined length, thereby confining a closed magnetic flux loop generated by the magnet.

* * * * *